United States Patent [19]

Ettemeyer

[11] Patent Number: 5,763,789

[45] Date of Patent: Jun. 9, 1998

[54] METHOD AND AN APPARATUS FOR THE ENLARGEMENT OF THE MEASURING RANGE OF SPECKLE MEASURING SYSTEMS FOR MEASURMENTS OF ELONGATION

[75] Inventor: Andreas Ettemeyer, Neu-Ulm, Germany

[73] Assignee: Ettemeyer GmbH & Co., Neu-Ulm, Germany

[21] Appl. No.: 918,685

[22] Filed: Aug. 21, 1997

Related U.S. Application Data

[63] Continuation of Ser. No. 644,752, May 9, 1996, abandoned.

[30] Foreign Application Priority Data

Jun. 2, 1995 [DE] Germany ............ 195 20 371.2

[51] Int. Cl.$^6$ ........................................... G01L 1/24
[52] U.S. Cl. ................................. 73/800; 73/826

[58] Field of Search ............... 73/800, 760, 766, 73/806, 826, 855

[56] References Cited

U.S. PATENT DOCUMENTS

| | | | |
|---|---|---|---|
| 4,869,110 | 9/1989 | Kent et al. | 73/800 |
| 4,962,669 | 10/1990 | Gernhart et al. | 73/800 |
| 5,199,304 | 4/1993 | Ferguson | 73/800 |
| 5,568,259 | 10/1996 | Kamergawa | 73/800 |

*Primary Examiner*—George M. Dombroske
*Assistant Examiner*—Max H. Noori
*Attorney, Agent, or Firm*—Skjerven Morrill MacPherson Franklin & Friel LLP

[57] ABSTRACT

A method or an apparatus for enlarging the range of measurement of speckle measuring systems for elongation measurement on a sample in a testing machine employs a speckle sensor, the sample in the testing machine being loaded in a loading device and the speckle sensor being moved jointly therewith on loading of said sample.

16 Claims, 4 Drawing Sheets

METHOD AND AN APPARATUS FOR THE ENLARGEMENT OF THE MEASURING RANGE OF SPECKLE MEASURING SYSTEMS FOR MEASURMENTS OF ELONGATION

This application is a continuation of application Ser. No. 08/644,752, filed May 9, 1996, now is abandoned.

BACKGROUND OF THE INVENTION

The invention relates to a method and an apparatus for enlargement of the measuring range of speckle measuring systems for measurements of elongation of a sample in a testing machine.

Speckle measuring methods make it possible to measure displacement and elongation of a sample surface in testing machines area-wise, without markings and without making contact with a high degree of accuracy. One- to three-dimensional displacement components of the sample can be measured, larger amplitudes of movement being able to be tackled by serial measurement of a plurality of small steps and summation of the results of measurement.

The use of the speckle measurement method in material testing equipment does however involve a problem. Namely owing to overall elongation of the sample and owing to yield of sample hold the sample surface in the field of measurement can be significantly more displaced than the extent of the elongation itself. The sample frequently moves to a greater extent than the amount of its elongation, since it is elongated along its full length, but is only measured in a fractional range.

FIG. 1 will serve to diagrammatically explain this problem occurring due to superimposition of elongation (dl/l) and significant movement (u). FIG. 2 shows an example for a one-dimensionally measuring sensor, which measures the movements of the sample in the load direction. In this case a sample 5 is held between a lower crosspiece 1 and an upper crosspiece 2. The lower crosspiece 1 and the upper crosspiece 2 belong to a load applying device of a testing machine, not illustrated. Reference numeral 4 denotes the field of measurement, toward which a speckle sensor 6 is directed. The loading direction is indicated by an arrow 3. It will be evident that on loading the sample 5 there will be a bodily displacement of the speckle pattern with the consequence that due to decorrelation effects the contrast of measurement is reduced. In some cases this may even render the use of speckle measuring technology impossible. In the context of metrology this will be the same as an impairment of the ratio between working signals (elongation) and noise signals (rigid body displacement).

A further disadvantage occurring with the application of speckle measurement method is that the observed points of the surface in the case of substantial load amplitudes are also so displaced macroscopically from the original image position that correlation between them is no longer possible.

SUMMARY OF THE INVENTION

Accordingly one object of the invention is to so improve on a method and on an apparatus of the type above-mentioned that with the use of speckle measuring technology trustworthy and reliable measurements of surface elongation are possible using sample test machines.

In accordance with the invention this aim is to be achieved by loading the sample in the testing machine in a loading direction and then moving the speckle sensor along with the test sample in the load direction.

Preferred features leading to further advantageous developments of the invention are disclosed herein.

In accordance with the invention there is accordingly the advantage that the rigid body fraction of the sample movement may be compensated for by accompanying or follow-up motion of the speckle sensor with the result that the measurement range of the speckle measuring system is substantially expanded. It is expedient for the speckle sensor to be so caused to perform a follow-up movement, i. e. to keep up with the movement of the sample, that the center of the field of the measurement is at all times at the same object point on loading and displacement of the sample. Accordingly there is a substantial improvement in the signal/noise ratio.

In accordance with a preferred embodiment of the invention a speckle sensor is caused to follow up in at least one direction of elongation of the sample, but preferably respectively (in the case of one sensor) in two or three directions in space.

For causing follow-up movement of a speckle sensor there are several possibilities. In accordance with one embodiment of the invention a speckle sensor is caused to follow up by a mechanical coupling between the sensor holding means and the loading device. As an alternative, in accordance with another embodiment there is a provision such that a sensor is moved by one or more separate drives taking into account its respective reading or result of measurement and/or taking into account one or more external signals and/or taking into account the control of the testing machine.

For its follow-up movement each speckle sensor is preferably arranged on a shifting slide, which in accordance with a further embodiment of the invention is coupled to the loading device either using a linkage with a thrust joint or using a gear wheel drive, a toothed belt or cords. As an alternative the shifting slide comprises one or more separate drives, which are electronically controlled, preferably by data read by the sensor itself and/or data read by a separate measurement device and/or data read by the controller of the testing machine to be provided for such electronic control.

DESCRIPTION OF THE PREFERRED EMBODIMENTS

Figure 1:
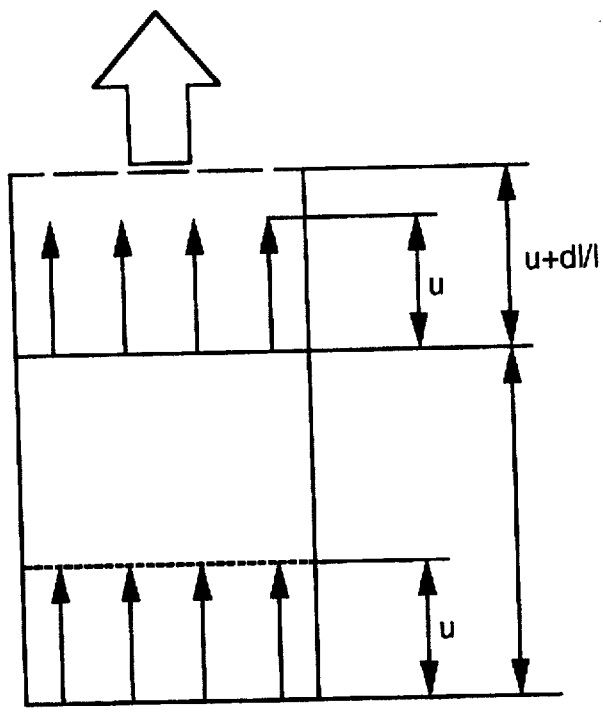
FIG. 1 shows a diagrammatic representation of the superimposition of elongation and a substantial movement with one-dimensional loading the sample.
Figure 2:
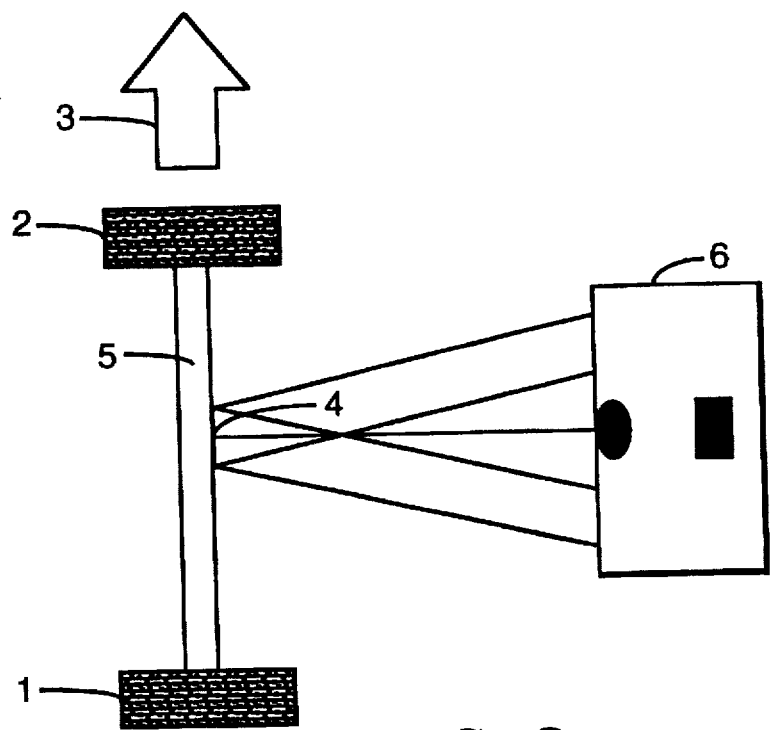
FIG. 2 is a diagrammatic showing of one example of a sensor measuring in one dimension and which measures the movement of the sample in the direction of loading.
Figure 3:
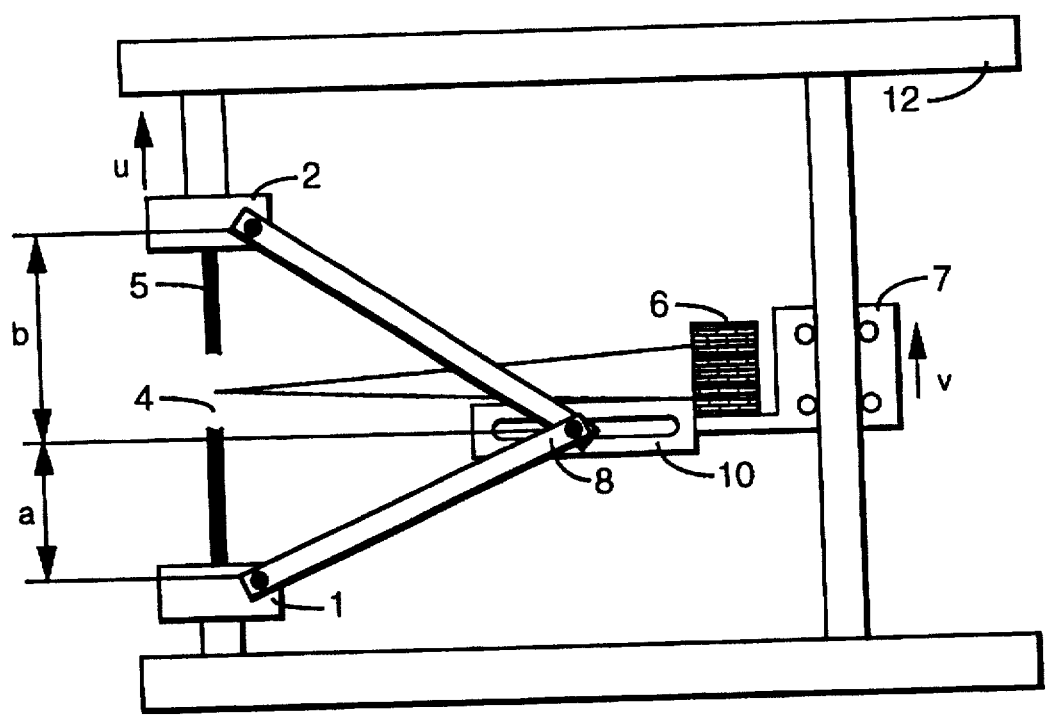
FIG. 3 is a diagrammatic representation of one embodiment of an apparatus in accordance with the invention, wherein the displacement of the sensor is performed by a mechanical coupling with the loading device acting via a linkage and a thrust joint.

FIG. 3 diagrammatically shows a working embodiment of an apparatus in accordance with the invention, wherein displacement is provided for by a coupling using a linkage 8 and a thrust joint 10. The linkage 8 comprises two rods which are articulatingly joined with the thrust joint 10 and have their other ends pivotally connected with the upper crosspiece 2 and, respectively, the lower crosspiece 1. Reference numeral 7 is employed to indicate a shifting slide, on which the speckle sensor 6 is mounted. The shifting slide 7 runs parallel to the load direction on a section 11 constituting a part of the testing machine 12. Owing to the adoption of this arrangement there is the advantage that, during loading and displacement of the sample 5, the center of the field of measurement of the sensor 6 will always remain at the same object point, because the ratio between a distance a from the lower crosspiece 1 to the lower edge of the field 4 of measurement and a length b from the lower end of the field 4 of measurement and the upper crosspiece 2 does not change.

Figure 4:
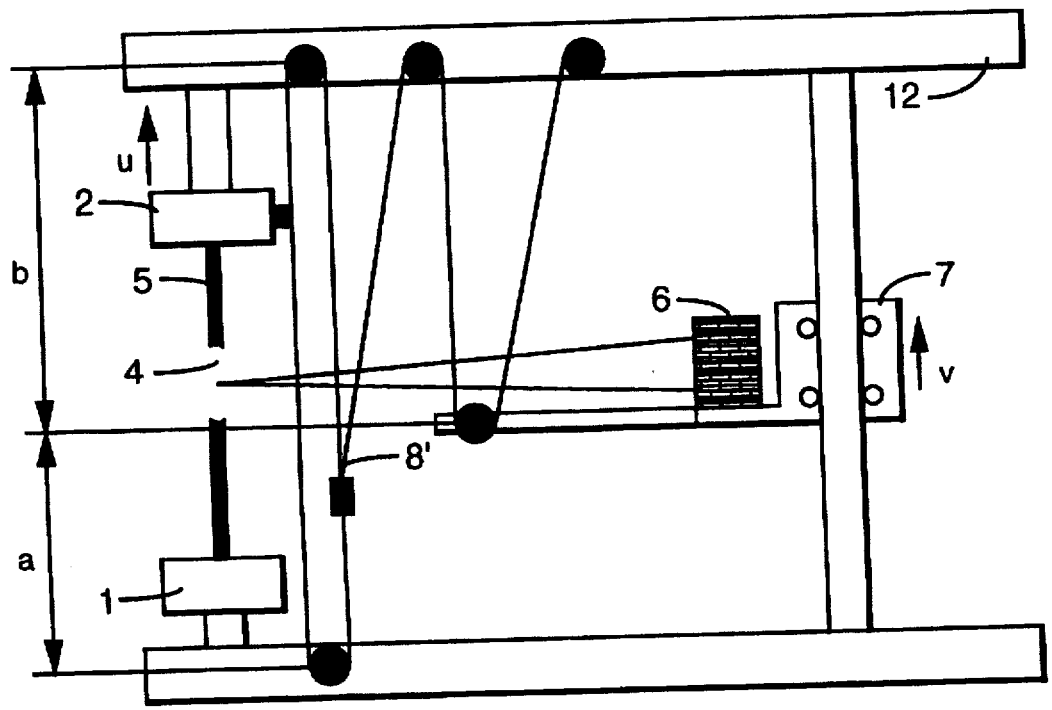
FIG. 4 is a diagrammatically represented working embodiment of an apparatus, in which the displacement of the sensor is performed by a mechanical coupling using toothed belts or using cords.

FIG. 4 shows an alternative embodiment of an apparatus, in which the displacement of the sensor 6 on its shifting slide 7 is brought about using toothed belts 8'. In this case the movement of the measuring instrument and, respectively, of the sensor takes place at half the crosspiece speed.

Figure 5:
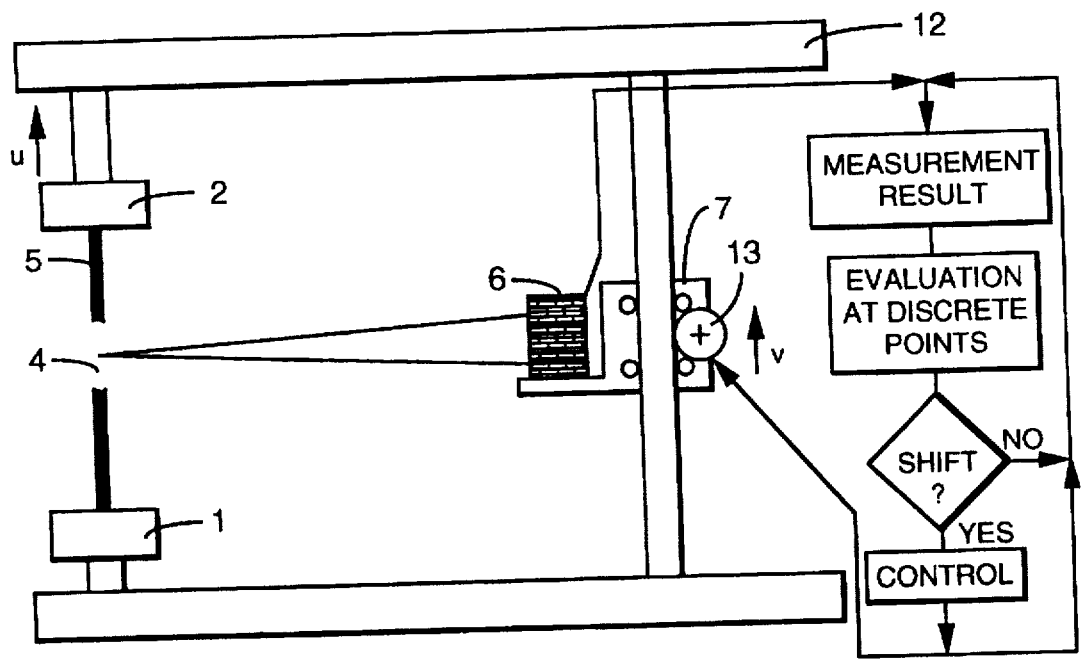
FIG. 5 is a diagrammatic representation of one example for an electronic control system for sensor displacement, the displacement being calculated from data coming from the sensor itself.
Figure 6:
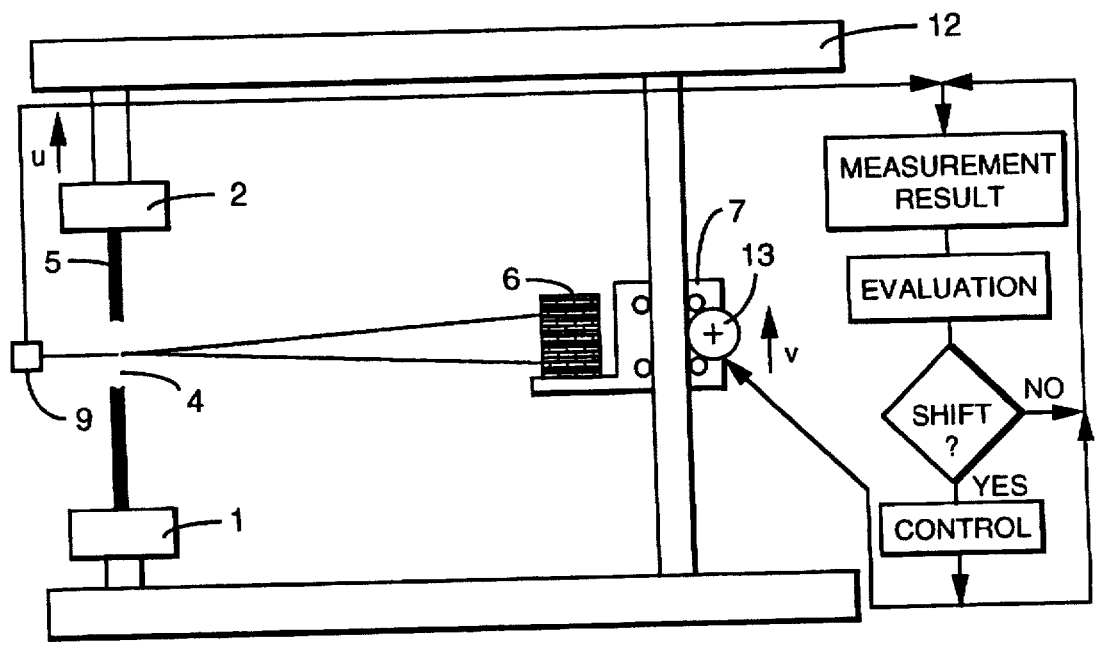
FIG. 6 is a diagrammatic representation of one example for an electronic control system for sensor displacement, such displacement being calculated from data produced by a further measuring device.
Figure 7:
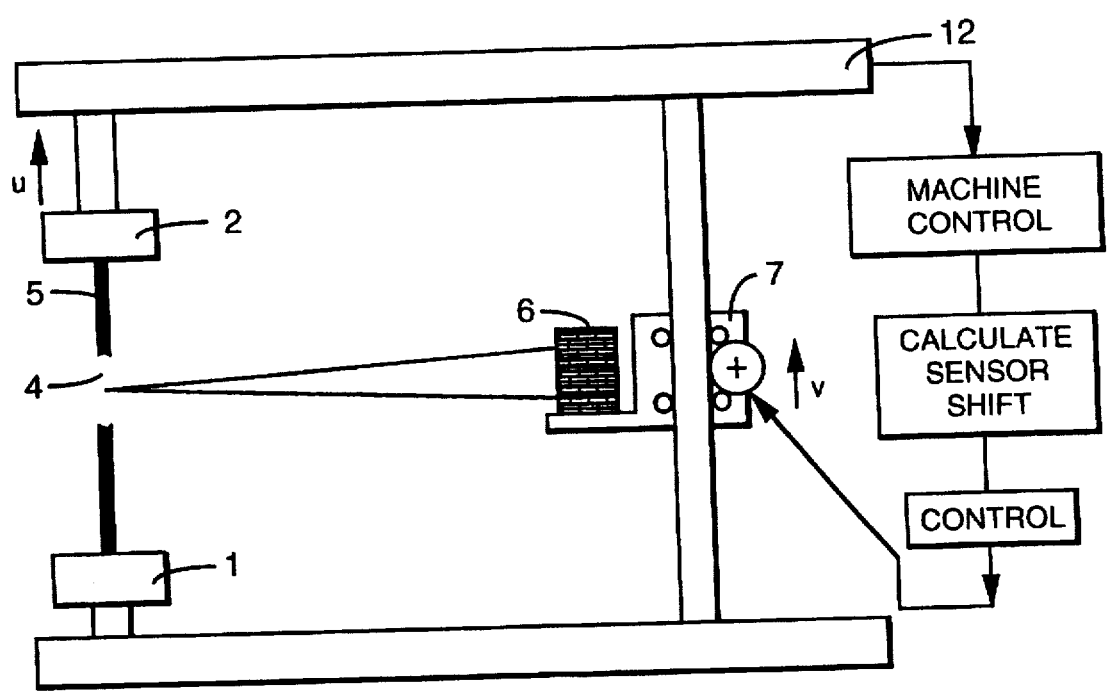
FIG. 7 diagrammatically shows an example of electronic control of sensor displacement, the amount of displacement being determined from the control system of the testing machine.

In FIGS. 5 through 7 different embodiments are shown for an electronic control of the shifting slide 7, same having one or more separate drives 13.

As shown in FIG. 5 electronic control of the separate drive or drives 13 is implemented using data obtained from the sensor 6 itself, something which is readily possible with the diagrammatically illustrated control logic.

In accordance with FIG. 6 for control of shift of the sensor 6 a further measuring instrument 9 only measuring at discrete points is provided, whereas in FIG. 7 the data read or produced by the testing machine 12 are provided for electronic control of the drive 13 for the purpose of shifting the sensor 6 by shifting slide 7.

I claim:

1. A method for enlargement of a range of measurement of speckle measuring systems for measurement of elongation of a sample in a testing machine, comprising the steps of:

providing a speckle sensor and a loading device;

loading the sample into the loading device in the testing machine; and moving the speckle sensor in correspondence with a movement of the sample on the loading thereof such that a center of the field of measurement of the sample is at all times at the same object point on the loading and displacement of the sample.

2. The method as set forth in claim 1, wherein the moving of the speckle sensor step is performed in a follow-up movement in at least one elongation direction of the sample.

3. The method as set forth in claim 1, wherein the moving of the speckle sensor step is performed in a follow-up movement in two or three directions in space.

4. The method as set forth in claim 1, further including the step of providing a sensor holder and wherein a follow-up movement of said speckle sensor is produced by a mechanical coupling between the sensor holder and the loading device.

5. The method as set forth in claim 1, wherein the moving of the speckle sensor step comprises electrically moving the speckle sensor as a function of an instant result of measurement.

6. The method as set forth in claim 1, wherein the moving of the speckle sensor step comprises electrically moving the speckle sensor as a function of one or more external signals.

7. The method as set forth in claim 1, wherein the moving of the speckle sensor step comprises electrically moving the speckle sensor in response to signals from the testing machine.

8. An apparatus for enlarging a range of measurement of speckle measuring systems for elongation measurement on a sample extending longitudinally in a testing machine, comprising a speckle sensor, a loading device mounting said speckle sensor and structure, which on loading of said sample, causes said speckle sensor to move conjointly with the sample in the loading device of the testing machine.

9. The apparatus as set forth in claim 8, further comprising a shifting slide extending in parallelism with the mounted sample and wherein said speckle senor is mounted on the shifting slide.

10. The apparatus as set forth in claim 9, wherein said shifting slide is mechanically coupled with said loading device.

11. The apparatus as set forth in claim 9, wherein said shifting slide is mechanically coupled with said loading device by a linkage with a thrust joint.

12. The apparatus as set forth in claim 9, wherein said shifting slide is mechanically coupled with said loading device by gear wheel drives, toothed belts or cords.

13. The apparatus as set forth in claim 9, wherein said shifting slide comprises one or more separate drives, which are able to be electronically controlled for a certain distance of shift of said speckle sensor.

14. The apparatus as set forth in claim 9, wherein said shifting slide comprises one or more separate drives, which are able to be electronically controlled for a certain distance of shift of said speckle sensor by electronic control data produced by said speckle sensor.

15. The apparatus as set forth in claim 9, wherein said shifting slide comprises one or more separate drives, which are able to be electronically controlled for a certain distance of shift of said speckle sensor by electronic control data produced at a separate control and measuring device.

16. The apparatus as set forth in claim 9, wherein said shifting slide comprises one or more separate drives, which are able to be electronically controlled for a certain distance of shift of said speckle sensor by electronic control data produced by a control means of the testing machine.

* * * * *